United States Patent
Yamashita et al.

(10) Patent No.: US 9,056,999 B2
(45) Date of Patent: Jun. 16, 2015

(54) ULTRAVIOLET-CURABLE AQUEOUS INK, INK CARTRIDGE, RECORDING APPARATUS AND RECORDING METHOD

(71) Applicant: Fuji Xerox Co., Ltd., Tokyo (JP)

(72) Inventors: Yoshiro Yamashita, Kanagawa (JP); Hiroyuki Ueki, Kanagawa (JP); Mami Hatanaka, Kanagawa (JP); Toshitake Yui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/107,098

(22) Filed: Dec. 16, 2013

(65) Prior Publication Data

US 2014/0347427 A1     Nov. 27, 2014

(30) Foreign Application Priority Data

May 24, 2013   (JP) .................................. 2013-110126

(51) Int. Cl.
| | |
|---|---|
| *G01D 11/00* | (2006.01) |
| *B41J 2/17* | (2006.01) |
| *C09D 11/38* | (2014.01) |
| *B41J 11/00* | (2006.01) |
| *B41J 2/175* | (2006.01) |

(52) U.S. Cl.
CPC ............... *C09D 11/38* (2013.01); *B41J 11/002* (2013.01); *B41J 2/17503* (2013.01)

(58) Field of Classification Search
USPC ............................................ 347/95, 100, 102
See application file for complete search history.

(56) References Cited

U.S. PATENT DOCUMENTS

| | | | |
|---|---|---|---|
| 7,264,664 B2 * | 9/2007 | Kamoto et al. | 106/31.59 |
| 7,900,558 B2 * | 3/2011 | Yokoi | 101/130 |
| 8,342,674 B2 * | 1/2013 | Araki | 347/102 |
| 8,426,495 B2 * | 4/2013 | Morimoto | 523/160 |

FOREIGN PATENT DOCUMENTS

| | | |
|---|---|---|
| JP | 2008-280427 | 11/2008 |
| JP | 2010-229181 | 10/2010 |

OTHER PUBLICATIONS

English language abstract and machine translation of JP 2010-229181.
English language abstract and machine translation of JP 2008-280427.

\* cited by examiner

*Primary Examiner* — Anh T. N. Vo
(74) *Attorney, Agent, or Firm* — Fildes & Outland, P.C.

(57) ABSTRACT

There is provided an ultraviolet-curable aqueous ink containing: an ultraviolet polymerizable compound; a water-insoluble thioxanthone compound having an absorption at a wavelength range of 375 nm or more and 450 nm or less, a water-insoluble tertiary amine compound, water, and a water-soluble organic solvent at least including a solvent (A) that dissolves the thioxanthone compound and the tertiary amine compound.

4 Claims, 2 Drawing Sheets

US 9,056,999 B2

ULTRAVIOLET-CURABLE AQUEOUS INK, INK CARTRIDGE, RECORDING APPARATUS AND RECORDING METHOD

CROSS-REFERENCE TO RELATED APPLICATIONS

This application is based on and claims priority under 35 USC 119 from Japanese Patent Application No. 2013-110126 filed on May 24, 2013.

BACKGROUND

Field

The present invention relates to an ultraviolet (UV)-curable aqueous ink, an ink cartridge, a recording apparatus and a recording method.

Japanese Patent Laid-Open No. 2010-229181 discloses "an ink for inkjet, that contains a color material, water, a photo-polymerization initiator, a UV-curable resin and a water-soluble organic solvent, in which the water-soluble organic solvent contains a 3- to 10-membered ring heterocyclic compound containing a specific structure in a ring structure thereof, and the photo-polymerization initiator contains at least two kinds of initiators including a first photo-polymerization initiator having an absorption at a wavelength range of less than 380 nm, and a second photo-polymerization initiator having an absorption at a wavelength range of 380 nm or more".

Japanese Patent Laid-Open No. 2008-280427 discloses "a UV-curable ink at least containing water, a water-soluble solvent, a compound having an ethylenically unsaturated group, and a benzophenone compound having a specific structure or a thioxanthone compound having a specific structure as a photo-initiator."

SUMMARY

[1] An ultraviolet-curable aqueous ink containing:
an ultraviolet polymerizable compound;
a water-insoluble thioxanthone compound having an absorption at a wavelength range of 375 nm or more and 450 nm or less,
a water-insoluble tertiary amine compound,
water, and
a water-soluble organic solvent at least including a solvent (A) that dissolves the thioxanthone compound and the tertiary amine compound.

DETAILED DESCRIPTION

Figure 1:
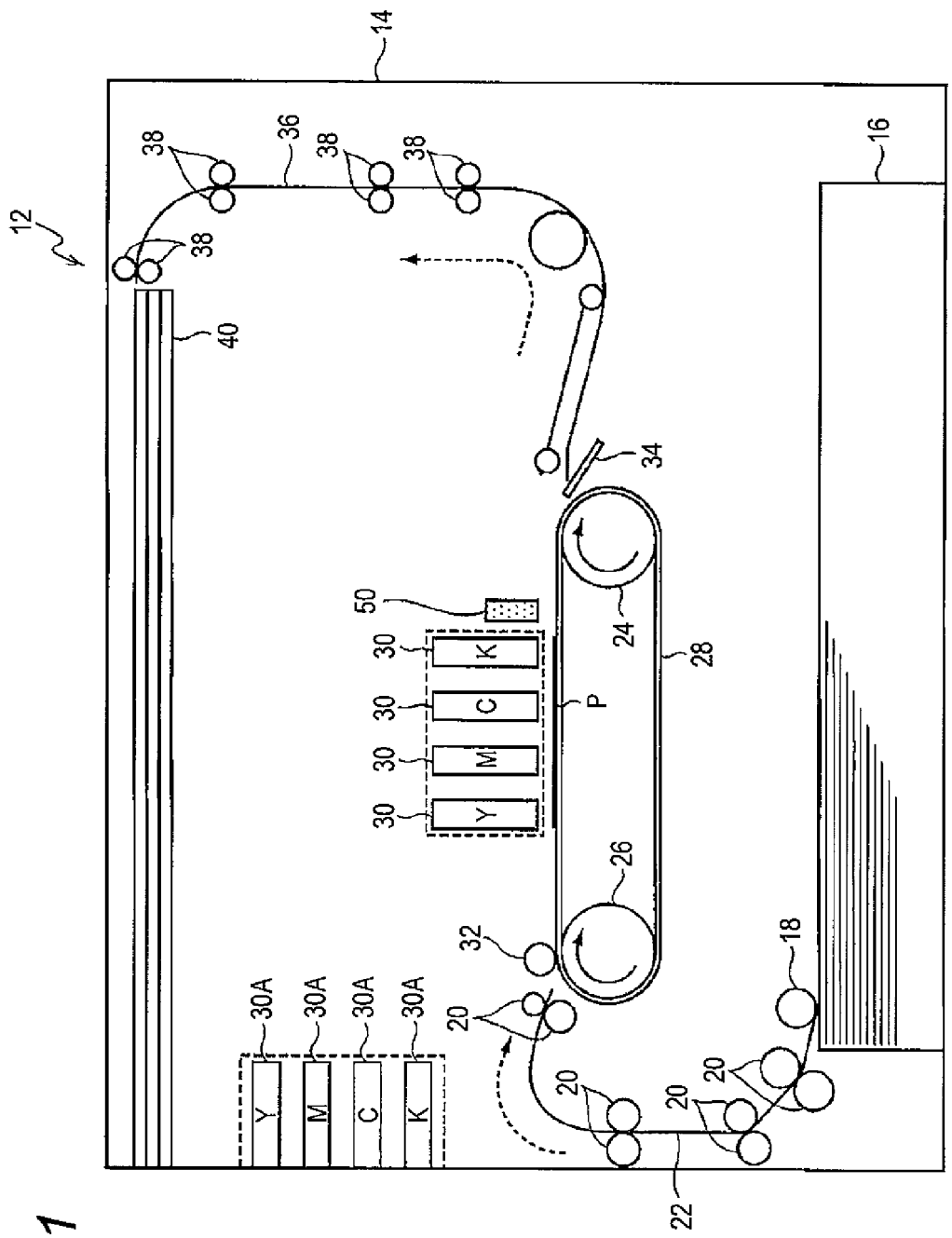
FIG. 1 is a schematic view illustrating an inkjet recording apparatus according to the present exemplary embodiment.

Hereinafter, an exemplary embodiment of the present invention will be described in detail.
[Ultraviolet-Curable Aqueous Ink]

An ultraviolet-curable aqueous ink (hereinafter, referred to as "ink") according to the present exemplary embodiment contains an ultraviolet polymerizable compound, an ultraviolet polymerization initiator, a hydrogen donor agent (ultraviolet polymerization auxiliary initiator), water and a water-soluble organic solvent.

The ink according to the present exemplary embodiment contains a water-insoluble thioxanthone compound having an absorption at a wavelength range of 375 nm or more and 450 nm or less (that is, an optical absorption resolution wavelength) as the ultraviolet polymerization initiator, and a water-insoluble tertiary amine compound as the hydrogen donor agent (a polymerization auxiliary initiator), and the water-soluble organic solvent at least contains a solvent (A) that dissolves the thioxanthone compound and the tertiary amine compound therein.

Here, it has been recently investigated that a recording apparatus using the ultraviolet-curable ink is mounted with a light source [e.g., ultraviolet light emitting diode; hereinafter referred to as "UV-LED"] that irradiates UV rays at a wavelength range at a long wavelength side (a wavelength range of 375 nm or more and 450 nm or less) close to a visible range, the light source having a better energy efficiency than a conventional lamp, such as a mercury lamp or a metal halide lamp, that irradiates UV rays at a short wavelength side.

Meanwhile, it is known that an oil-based ink as an ultraviolet-curable ink is inferior in smoothness on a recording surface (printing surface) because its volatility is low or its permeability into a recording medium is low. Thus, a requirement for using an aqueous ink that is good in volatility and permeability into a recording medium has been increased.

However, in an ultraviolet-curable aqueous ink, when an ultraviolet polymerization initiator and a hydrogen donor agent are low in the solubility or dispersibility in water, the polymerization rate (curing rate) of a ultraviolet polymerizable compound may be lowered, and an offset may occur regardless of sheet of paper or roll paper as a recording medium, thereby making it difficult for high speed recording to be achieved. Further, the ultraviolet polymerization initiator and the hydrogen donor agent may be precipitated in the ink with elapse of time, thereby degrading the storage stability of the ink.

In particular, a material system that contains a water-insoluble thioxanthone compound having an absorption at a wavelength range of 375 nm or more and 450 nm or less as the ultraviolet polymerization initiator, and a water-insoluble tertiary amine compound as the hydrogen donor agent (polymerization auxiliary initiator) in combination has a high curability of an ultraviolet polymerizable compound, but a technology of improving the solubility or dispersibility in water has not been established. Further, there is a technology of water-solubilizing the thioxanthone compound, but the technology is not enough yet to improve the solubility or dispersibility in water.

Therefore, the ink according to the present exemplary embodiment, due to the above described composition, is excellent in storage stability, and suppresses the occurrence of an offset (a phenomenon at which an ink is transferred to a member for winding a recording medium or an overlapped recording medium when the recording medium is overlapped) even by irradiation of UV rays at a wavelength range at a long wavelength side (a wavelength range of 375 nm or more and 450 nm or less), thereby achieving high speed recording.

The reason for this is unclear, but is assumed that in order to achieve polymerization of the ultraviolet polymerizable compound by irradiation of UV rays at a wavelength range at a long wavelength side (a wavelength range of 375 nm or more and 450 nm or less), the water-insoluble thioxanthone compound having an absorption at a wavelength range of 375 nm or more and 450 nm or less as the ultraviolet polymerization initiator, and the water-insoluble tertiary amine compound as the hydrogen donor agent (ultraviolet polymerization auxiliary initiator) are used in combination with a solvent for dissolving these compounds therein, as the water-soluble organic solvent, and thus even water-insoluble materials such as the thioxanthone compound and the tertiary amine compound have an increased dispersibility by being apparently dissolved in water. It is considered that such an increase of the dispersibility allows the thioxanthone compound and the tertiary amine compound to be easily present around the ultraviolet polymerizable compound, thereby increasing the polymerization rate (curing rate) by irradiation of UV rays. Further, it is thought that the thioxanthone compound and the tertiary amine compound are suppressed from being precipitated in water with elapse of time.

For this reason, it is considered that through the above described composition, the ink according to the present exemplary embodiment suppresses the occurrence of an offset even by irradiation of UV rays at a wavelength range at a long wavelength side (a wavelength range of 375 nm or more and 450 nm or less), thereby achieving high speed recording, and is excellent in storage stability.

Hereinafter, an ink according to the present exemplary embodiment will be described in detail.

The ink according to the present exemplary embodiment contains an ultraviolet polymerizable compound, an ultraviolet polymerization initiator, a hydrogen donor agent (ultraviolet polymerization auxiliary initiator), water, and a water-soluble organic solvent. An aqueous ink may further contain, if necessary, a coloring agent, a surfactant and other additives.

(Ultraviolet Polymerizable Compound)

The ultraviolet polymerizable compound may be exemplified with a compound having a polymerizable group that is radically polymerized by UV rays, and may be a monomer, an oligomer, or a mixture thereof. As the polymerizable group, a group having an ethylenically unsaturated double bond may be exemplified, and specific examples thereof may include an acryloyl group, a methacryloyl group, a vinyl group, a vinyl ether group, a maleic anhydride group, and an N-substituted maleimide group.

The ultraviolet polymerizable compound may be a water-soluble ultraviolet polymerizable compound or a water-insoluble ultraviolet polymerizable compound. In the ultraviolet polymerizable compound, "water-soluble" means that an object material is dissolved in an amount of 5 parts by mass or more (preferably, 10 parts by mass or more) based on 100 parts by mass of water at 25° C. Meanwhile, "water-insoluble" means that an object material is dissolved in an amount of less than 5 parts by mass based on 100 parts by mass of water at 25° C.

As the water-soluble ultraviolet polymerizable compound, a conventionally known UV polymerizable compound may be exemplified, and specific examples thereof may include radical polymerizable monomers such as acryloyl morpholine (ACMO), hydroxyethyl acrylamide (HEAA), diacetone acrylamide, N-vinyl-2-pyrrolidone, N-vinyl-formamide, vinyl naphthalene sulfonic acid, hydroxyethyl(meth)acrylate, methoxypolyethylene glycolmethacrylate, methoxy polyethylene glycolacrylate, ester of succinic anhydride and 2-hydroxyethyl(meth)acrylate, and ester of orthophthalic anhydride and 2-hydroxyethyl(meth)acrylate.

As the water-soluble ultraviolet polymerizable monomer, a radical polymerizable monomer such as (meth)acrylate ester of polyhydric alcohol, and (meth)acrylate ester of glycidyl ether derived from polyhydric alcohol may also be exemplified.

As the water-soluble ultraviolet polymerizable compound, an oligomer obtained by polymerizing water-soluble ultraviolet polymerizable monomers to a required degree of polymerization may also be exemplified.

As the water-insoluble ultraviolet polymerizable compound, a conventionally known water-insoluble ultraviolet polymerizable substance may be exemplified, and specific examples of the water-insoluble ultraviolet polymerizable substance may include radical polymerizable monomers such as alcohols, acrylate esters of polyhydric alcohols or amino alcohols; methacrylate esters of alcohols or polyhydric alcohols; acrylic aliphatic amides; acrylic alicyclic amides; and acrylic aromatic amides.

As the water-insoluble ultraviolet polymerizable compound, oligomers obtained by polymerizing water-insoluble ultraviolet polymerizable monomers to a required degree of polymerization; and oligomers of acrylate (e.g., epoxy acrylate, urethane acrylate, polyester acrylate, polyether acrylate, urethane methacrylate, and polyester methacrylate) having an acryloyl group or a methacryloyl group on an epoxy skeleton, an urethane skeleton, a polyester skeleton or a polyether skeleton may also be exemplified.

The water-insoluble ultraviolet polymerizable compound is emulsified and dispersed in an aqueous ink by a conventionally known method. The water-insoluble ultraviolet polymerizable material may be a self-emulsified or emulsified by a dispersant.

The ultraviolet polymerizable compound may be used either alone or in combination of two or more kinds thereof.

The content (concentration) of the ultraviolet polymerizable compound is, for example. preferably from 5 mass % to 70 mass %, more preferably from 10 mass % to 60 mass %, and further more preferably from 15 mass % to 50 mass %, based on ink.

(Ultraviolet Polymerization Initiator)

As the ultraviolet polymerization initiator, a water-insoluble thioxanthone compound is employed. In the ultraviolet polymerization initiator, "water-soluble" means that an object material is dissolved in an amount of 0.1 parts by mass or more based on 100 parts by mass of water at 25° C. Meanwhile, "water-insoluble" means that an object material is dissolved in an amount of less than 0.1 parts by mass based on 100 parts by mass of water at 25° C.

As the thioxanthone compound, a thioxanthone compound having an absorption at a wavelength range of 375 nm or more and 450 nm or less is employed. That is, as the thioxanthone compound, a compound that generates radicals by irradiation of UV rays at the wavelength range of 375 nm or more and 450 nm or less is employed.

The thioxanthone compound may be exemplified with a thioxanthone compound represented by following Formula (TK).

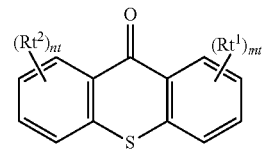

(TK)

In Formula (TK), $Rt^1$ and $Rt^2$ each independently represent a halogen atom, a substituted or unsubstituted alkyl group, a group wherein a substituted or unsubstituted alkyl group is bonded to an ester group, or a substituted or unsubstituted alkylether group. mt and nt each independently represent 0, or an integer from 1 to 3.

When mt represents an integer of 2 or more, a plurality of $Rt^1$'s may be the same or different from every other $Rt^1$'s. Likewise, when nt represents an integer of 2 or more, a plurality of $Rt^2$'s may be the same or different from every other $Rt^2$'s.

In Formula (TK), examples of the halogen atom represented by $Rt^1$ and $Rt^2$ may include a fluorine atom, a chlorine atom, and a bromine atom.

The alkyl group represented by $Rt^1$ and $Rt^2$ may be any one of a linear group and a branched group, and, for example, may be an alkyl group having 1 to 10 carbon atoms (preferably 1 to 5 carbon atoms, and more preferably 1 to 3 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

The alkylether group represented by $Rt^1$ and $Rt^2$ may be any one of a linear group and a branched group, and, for example, may be an alkoxy group having 1 to 10 carbon atoms (preferably 1 to 5 carbon atoms, and more preferably 1 to 3 carbon atoms). Examples of the linear alkoxy group may include a methoxy group, an ethoxy group, an n-propoxy group, and an n-butoxy group. Examples of the branched alkoxy group may include an isopropoxy group, an isobutoxy group, a sec-butoxy group, a tert-butoxy group, and a 2-ethylhexyloxy group.

As a substituent by which the alkyl group or alkylether group represented by $Rt^1$ and $Rt^2$ may be substituted, a hydroxyl group, an amino group, an alkoxy group, an amide group, a carbonyl group, and a halogen atom may be exemplified.

As the thioxanthone compound represented by Formula (TK), a compound in which $Rt^1$ represents an alkyl group, mt represents 0, or an integer from 1 to 2, and nt represents 0 is suitable.

Specific examples of the thioxanthone compound may include isopropyl thioxanthone, diethyl thioxanthone, chlorothioxanthone, dimethyl thioxanthone, methylethyl xanthone, and methyl isopropyl xanthone.

The ultraviolet polymerization initiator may be used in combination with other ultraviolet polymerization initiators other than the thioxanthone compound, if necessary. However, it is preferable that other ultraviolet polymerization initiator is used in an amount of 20 mass % or less based on the total of the ultraviolet polymerization initiator.

As other ultraviolet polymerization initiator, a water-soluble ultraviolet polymerization initiator or a water-insoluble ultraviolet polymerization initiator may be employed.

Examples of other water-soluble ultraviolet polymerization initiators may include conventionally known ultraviolet polymerization initiators such as hydroxyacetophenones (e.g., 1-phenyl-2-hydroxy-2-methyl-1-propanone, 1-hydroxy-cyclohexyl-phenyl-ketone, 1-[4-(2-hydroxyethoxy)-phenyl]-2-hydroxy-2-methyl-1-propanone), aminoacetophenones (e.g., 2-methyl-1-(4-methylthiophenyl)-2-morpholinopropane-1-one, 2-benzyl-2-dimethylamino-1-(4-morpholinophenyl)-butane-1-one), thioxanthone ammonium salts, and benzophenone ammonium salts.

Examples of other water-insoluble ultraviolet polymerization initiator may include conventionally known ultraviolet polymerization initiators such as a benzoin compound (e.g., benzoin ethylether, benzoin isopropyl ether), benzophenone, an acylphosphine oxide compound (bis(2,4,6-trimethylbenzoyl)-phenylphosphine oxide, bis(2,6-dimethoxybenzoyl)-2,4,4-trimethylpentyl phosphine oxide, 2,4,6-trimethylbenzoylphenyl ethoxyphosphine oxide, 2,4,6-trimethylbenzoyl diphenylphosphine oxide), and an anthraquinone compound (e.g., ethyl anthraquinone).

Other water-insoluble ultraviolet polymerization initiator may be emulsified and dispersed in an aqueous ink by a conventionally known method using a dispersant, etc., or may be dissolved or dispersed by a water-soluble organic solvent and dispersed in an ink.

The ultraviolet polymerization initiator may be used either alone or in combination of two or more kinds thereof.

The content of the ultraviolet polymerization initiator is, for example, preferably from 0.1 mass % to 20 mass %, more preferably from 0.1 mass % to 10 mass %, and further more preferably from 0.5 mass % to 10 mass %, based on the ink.

(Hydrogen Donor Agent (Ultraviolet Polymerization Auxiliary Initiator))

As the hydrogen donor agent (ultraviolet polymerization auxiliary initiator), a water-insoluble tertiary amine compound is employed. In the hydrogen donor agent, "water-soluble" means that an object material is dissolved in an amount of 1 part by mass or more based on 100 parts by mass of water at 25° C. Meanwhile, "water-insoluble" means that an object material is dissolved in an amount of less than 1 part by mass based on 100 parts by mass of water at 25° C.

As the tertiary amine compound, amine containing an aromatic group may be exemplified, and specifically, an amine compound containing a benzoic acid skeleton (e.g., a tertiary amine compound represented by the Following Formula (AM)) may be exemplified.

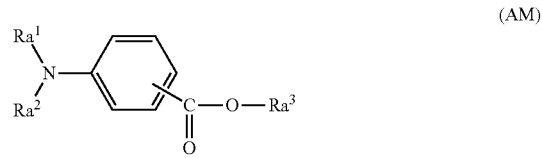

(AM)

In Formula (AM), $Ra^1$ and $Ra^2$ each independently represent a substituted or unsubstituted alkyl group, or a group wherein a substituted or unsubstituted alkyl group is bonded to an ester group. $Ra^1$ and $Ra^2$ may be linked to each other to form an unsubstituted or substituted alicyclic structure or a multi-membered ring structure containing a heteroatom. $Ra^1$ represents a substituted or unsubstituted alkyl group, or a group wherein a substituted or unsubstituted alkyl group is bonded to an ester group.

In Formula (AM), the alkyl group represented by $Ra^1$ and $Ra^2$ may be any one of a linear group and a branched group, and, for example, may be an alkyl group having 1 to 10 carbon atoms (preferably 1 to 7 carbon atoms, and more preferably 1 to 4 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

As the alicyclic structure or the multi-membered ring structure containing a heteroatom, which is formed by linking $Ra^1$ and $Ra^2$ to each other, a form containing the N atom represented in Formula (AM), such as a piperidinyl group, a piperazinyl group, and a morpholino group may be exemplified.

As a substituent by which the alkyl group or the multi-membered ring structure represented by $Ra^1$ and $Ra^2$ may be substituted, a hydroxyl group, an amino group, an alkoxy group, an amide group, a carbonyl group, and a halogen atom may be exemplified.

In Formula (AM), the alkyl group represented by $Ra^3$ may be any one of a linear group and a branched group, and, for example, may be an alkyl group having 1 to 10 carbon atoms (preferably 1 to 8 carbon atoms, and more preferably 1 to 5 carbon atoms). Examples of the linear alkyl group may include a methyl group, an ethyl group, an n-propyl group, an n-butyl group, an n-pentyl group, an n-hexyl group, an n-octyl group, and an n-nonyl group. Examples of the branched alkyl group may include an isopropyl group, an isobutyl group, a sec-butyl group, a tert-butyl group, an isohexyl group, and a 2-ethylhexyl group.

As a substituent by which the alkyl group represented by $Ra^3$ may be substituted, a hydroxyl group, an amino group, an alkoxy group, an amide group, a carbonyl group, and a halogen atom may be, exemplified.

Specific examples of the tertiary amine compound represented by Formula (AM) may include 2-dimethylamino ethyl benzoate, 4-dimethylamino ethyl benzoate, 4-dimethylamino isoamyl benzoate, 4-dimethylamino methyl benzoate, 4-dimethylamino 3-methylbutyl benzoate, 4-dimethylamino 2-ethylhexyl benzoate, p-piperidinyl methyl benzoate, p-piperidinyl ethyl benzoate, p-piperazinyl methyl benzoate, p-piperazinyl ethyl benzoate, p-morpholino methyl benzoate, p-morpholino ethyl benzoate, 4-diethylamino methyl benzoate, 4-diethylamino 3-methylbutyl benzoate, 2-diethylamino ethyl benzoate, 4-diethylamino ethyl benzoate, and 4-diethylamino isoamyl benzoate.

As the tertiary amine compound, other than the tertiary amine compound represented by Formula (AM), tripropylamine, tributylamine, dimethylphenyl piperazine, 1-(2-ethoxyphenylpiperazine, and 1-(2,6-dimethoxyphenyl) piperazine may be exemplified.

The hydrogen donor agent (ultraviolet polymerization auxiliary initiator) may be used in combination with other hydrogen donor agents besides the water-insoluble tertiary amine compound, if necessary. However, it is preferable that other hydrogen donor agent is used in an amount of 20 mass % or less based on the total of the hydrogen donor agent.

Examples of other hydrogen donor agents may include conventionally known hydrogen donor agents such as amine-containing compounds such as aliphatic amine, amine (piperidine) containing an aromatic group, and triethanolamine; urea-containing compounds such as allylurea, and o-tolylthiourea; sulfur-containing compounds such as sodium diethyldithiophosphate, and a soluble salt of aromatic sulfinic acid; a nitrile-containing compound such as N,N,di-substituted p amino benzonitrile; phosphorous-containing compounds such as tri-n-butylphosphine, sodium diethyl dithiophosphate; nitrogen-containing compounds such as Michler's ketone, N-nitrosohydroxyl amine derivatives, oxazolidine compounds, tetrahydro-1,3-oxazin compounds, and condensates of aldehyde (formaldehyde or acetaldehyde) and diamine; a polymerized amine constituted by a reaction product of an epoxy resin and amine; and triethanolamine triacrylate.

The hydrogen donor agent may be used either alone or in combination of two or more kinds thereof.

The content of the hydrogen donor agent is, for example, preferably from 0.01 mass % to 20 mass %, more preferably from 0.01 mass % to 10 mass %, and further more preferably from 0.1 mass % to 10 mass %, based on the ink.

(Water)

As water, ion-exchanged water, ultrapure water, distilled water, or ultrafiltration water may be appropriately exemplified, especially, from the standpoint of suppressing impurities from being mixed, or microorganisms from being produced.

The content of water is, for example, preferably from 10 mass % to 90 mass %, and more preferably from 20 mass % to 80 mass %, based on the ink.

(Water-Soluble Organic Solvent)

The water-soluble organic solvent at least contains the solvent (A) that dissolves the water-insoluble thioxanthone compound as the ultraviolet polymerization initiator, and the water-insoluble tertiary amine compound as the hydrogen donor agent therein. In the water-soluble organic solvent, "water-soluble" means that an object material is dissolved in an amount of 1 part by mass or more based on 100 parts by mass of water at 25° C.

As the solvent (A), a solvent in which a solubility of each of the thioxanthone compound and the tertiary amine compound is, for example, 8 mass % or more (preferably 10 mass % or more, and more preferably 12 mass % or more) is preferable. The solubility refers to a ratio of an amount of an object material dissolved in 100 parts by mass of the solvent (A) at 25° C.

As the solvent (A), a compound having a morpholine skeleton may be suitably exemplified, and specifically, a morpholine compound represented by the following Formula (MO) may be exemplified.

(MO)

In Formula (MO), $Rm^1$ represents a methyl group, a hydroxyl group, a carboxyl group, an amino group or halogen. $Rm^2$ represents a substituted or unsubstituted alkylene group, a carbonyl group, an ester group, or a group including a combination thereof. $Rm^2$ may represent a single bond. When $Rm^2$ represents a single bond, the morpholine compound represented by Formula (MO) becomes a compound in which $Rm^2$ is not present and $Rm^1$ is directly bonded to the morpholine skeleton without $Rm^2$.

The alkylene group represented by $Rm^2$ may be any one of a linear group and a branched group, and, for example, may be an alkylene group having 1 to 5 carbon atoms (preferably 1 to 3 carbon atoms). Examples of the linear alkylene group may include a methylene group, an ethylene group, an n-propylene group, an n-butylene group, and an n-pentylene group. Examples of the branched alkylene group may include an isopropylene group, an isobutylene group, a sec-butylene group, and a tert-butylene group.

Examples of a substituent by which the alkylene group represented by $Rm^2$ may be substituted may include a hydroxyl group, a carboxyl group, an amino group, and a halogen atom.

Hereinafter, specific examples of the morpholine compound represented by Formula (MO) will be exemplified, but the present invention is not limited thereto.

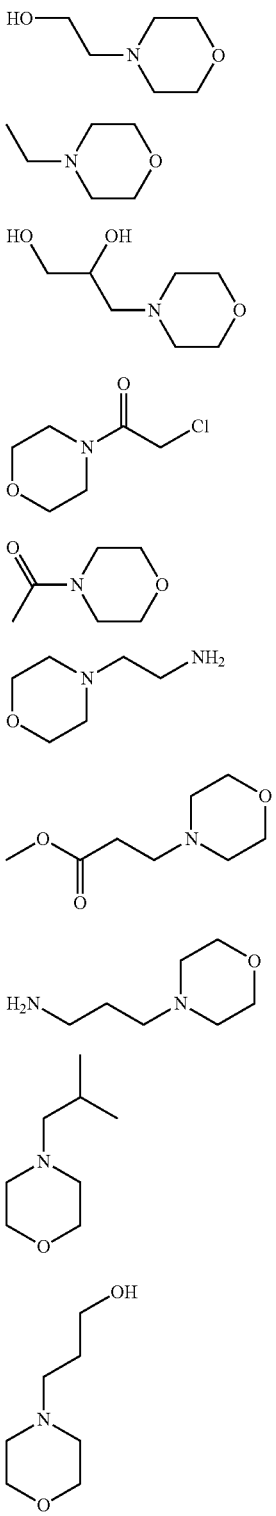

(MO-1)
(MO-2)
(MO-3)
(MO-4)
(MO-5)
(MO-6)
(MO-7)
(MO-8)
(MO-9)
(MO-10)

As the solvent (A), other than the above described compounds represented by Formula (MO), dimethylmorpholine as a compound having a morpholine skeleton may be exemplified.

As the solvent (A), other than the compound having a morpholine skeleton, alkoxy alcohol may be further exemplified.

Examples of alkoxy alcohol may include 2-(2-butoxyethoxy)ethanol, 2-(2-(2-butoxyethoxy)ethoxy)ethanol, diethyleneglucol monopropylether, diethyleneglycol hexylether, and diethyleneglycol monoethylether.

The solvent (A) may be used either alone or in combination of two or more kinds thereof.

The content of the solvent (A) is preferably from 30 mass % to 100mass %, more preferably from 40 mass % to 95 mass %, and further more preferably from 50 mass % to 90 mass %, based on the total of the water-soluble organic solvent.

As the water-soluble organic solvent, other than the solvent (A), other water-soluble organic solvent may be used in combination.

Examples of other water-soluble organic solvent may include polyhydric alcohols, polyhydric alcohol derivatives, a nitrogen-containing solvent, alcohols, and a sulfur-containing solvent. Further examples of the water-soluble organic solvent may include propylene carbonate, and ethylene carbonate.

Examples of the polyhydric alcohols may include sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the polyhydric alcohol derivatives may include ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin.

Examples of the nitrogen-containing solvent may include pyrrolidone, N-methyl-2-pyrrolidone, cyclohexylpyrrolidone, and triethanolamine.

Examples of the alcohols may include ethanol, isopropyl alcohol, butyl alcohol, and benzyl alcohol.

Examples of the sulfur-containing solvent may include thiodiethanol, thiodiglycerol, sulfolane, and dimethylsulfoxide.

The water-soluble organic solvent may be used either alone or in combination of two or more kinds thereof.

The content of the water-soluble organic solvent may preferably range from 1 mass % to 60 mass %, and more preferably from 1 mass % to 40 mass %, based on the water.

(Coloring Agent)

As the coloring agent, a pigment may be exemplified. Examples of the pigment may include an organic pigment and an inorganic pigment.

Specific examples of a black pigment may include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Co., Ltd), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation), Color Black FW1, Color Black FW2, Color Black FW2V, Color Black 18, Color Black FW200, Color Black 5150, Color Black S160, Color Black 5170, Printex35, Printex U, Printex V, Printex 140U, Printex 140V, Special Black 6, Special Black 5, Special Black 4A, and Special Black 4 (all manufactured by DEGUSSA Corporation), and No. 25, No. 33, No. 40, No. 47, No. 52, No. 900, No. 2300, MCF-88, MA600, MA7, MA8, and MA100 (all manufactured by Mitsubishi Chemical Corporation), but the present invention is not limited thereto.

Specific examples of a cyan color pigment may include C.I. Pigment Blue -1, -2, -3, -15, -15:1, -15:2, -15:3, -15:4, -16, -22, and -60, but the present invention is not limited thereto.

Specific examples of a magenta color pigment may include C.I. Pigment Red -5, -7, -12, -48, -48:1, -57, -112, -122, -123, -146, -168, -177, -184, -202, and C.I. Pigment Violet-19, but the present invention is not limited thereto.

Specific examples of a yellow pigment may include C.T. Pigment Yellow -1, -2, -3, -12, -13, -14, -16, -17, -73, -74, -75, -83, -93, -95, -97, -98, -114, -128, -129, -138, -151, -154, and -180, but the present invention is not limited thereto.

When the pigment is used as the coloring agent, a pigment dispersant is preferably used together with the pigment. Examples of the pigment dispersant that may be used may include a polymer dispersant, an anionic surfactant, a cationic surfactant, an amphoteric surfactant, and a nonionic surfactant.

As the polymer dispersant, a polymer having a hydrophilic structure and a hydrophobic structure is appropriately used. As the polymer having the hydrophilic structure and the hydrophobic structure, a condensation polymer or an addition polymer may be used. Examples of the condensation polymer may include a conventionally known polyester-based dispersant. Examples of the addition polymer may include an addition polymer of monomers having an α, β-ethylenically unsaturated group. By copolymerizing a monomer having an α, β-ethylenically unsaturated group having a hydrophilic group and a monomer having an α, β-ethylenically unsaturated group having a hydrophobic group in combination, a required polymer dispersant may be obtained. Further, a homopolymer of monomers having an α, β-ethylenically unsaturated group having a hydrophilic group may be used.

Examples of the monomer having an α, β-ethylenically unsaturated group having a hydrophilic group may include monomers having a carboxyl group, a sulfonate group, a hydroxyl group, a phosphate group or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Examples of the monomer having an α, β-ethylenically unsaturated group having a hydrophobic group may include styrene derivatives such as styrene, α-methylstyrene and vinyl toluene, vinyl cyclohexane, vinyl naphthalene, vinyl naphthalene derivatives, alkyl acrylate ester, alkyl methacrylate ester, phenyl methacrylate ester, cycloalkyl methacrylate ester, alkyl crotonate ester, dialkyl itaconate ester, dialkyl maleate ester and the like.

Preferable examples of the copolymer as the polymer dispersant may include styrene-styrene sulfonic acid copolymer, styrene-maleic acid copolymer, styrene-methacrylic acid copolymer, styrene-acrylic acid copolymer, vinylnaphthalene-maleic acid copolymer, vinyl naphthalene-methacrylic acid copolymer, vinylnaphthalene-acrylic acid copolymer, alkyl acrylate ester-acrylic acid copolymer, alkyl methacrylate ester-methacrylic acid copolymer, styrene-alkyl methacrylate ester-methacrylic acid copolymer, styrene-alkyl acrylate ester-acrylic acid copolymer, styrene-phenyl methacrylate ester-methacrylic acid copolymer, and styrene-cyclohexyl methacrylate ester-methacrylic acid copolymer.

Further, these polymers may be copolymerized with a monomer having a polyoxyethylene group, or a hydroxyl group.

The weight-average molecular weight of the polymer dispersant may range from 2,000 to 50,000.

These polymer dispersants may be used alone or in combination of two or more kinds thereof. The content of the polymer dispersant cannot be unconditionally determined because it largely varies according to the pigment. However, the content may range from 0.1 mass % to 100 mass % based on the pigment.

As the pigment, a self-dispersible pigment in water (hereinafter, referred to as a self-dispersion type pigment) may be also exemplified.

The self-dispersion type pigment refers to a pigment having water-solubilizing groups on the pigment surface, which can be dispersed in water even without the polymer dispersant. The self-dispersion type pigment, for example, is obtained by carrying out surface modification treatments, such as an acid/base treatment, a coupling agent treatment, a polymer graft treatment, a plasma treatment, an oxidation/reduction treatment, on a pigment.

Examples of the self-dispersion type pigment may include, in addition to the above described surface modified pigment, commercially available self-dispersion pigments such as Cab-o-jet-200, Cab-o-jet-300, Cab-o-jet-400, IJX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M manufactured by Cabot Corporation, and Microjet Black CW1, and CW-2 manufactured by Orient Chemical Industries Co., Ltd.

As the self-dispersion type pigment, a pigment at least having sulfonic acid, sulfonate, carboxylic acid, or carboxylate as a functional group on the surface thereof is preferable. Further, a pigment at least having carboxylic acid or carboxylate as a functional group on the surface thereof is more preferable.

Here, as the pigment, a pigment coated with a resin may be exemplified. This is called a microcapsule pigment, such as commercially available microcapsule pigments manufactured by DIC Corporation, or TOYO Ink Co., Ltd. The present invention is not limited to the commercially available microcapsule pigments. Microcapsule pigments prepared depending on their purposes may be used.

As the pigment, a resin-dispersion type pigment having a polymer compound physically adsorbed or chemically bonded to the pigment may also be exemplified.

As the pigment, besides a black pigment and three primary color pigments of cyan, magenta, and yellow, specific color pigments such as red, green, blue, brown, and white, metallic luster pigments such as gold and silver, colorless or light-colored extender pigments, and plastic pigments may also be exemplified.

As the pigment, particles obtained by fixing a dye or a pigment onto the surface of silica, alumina, or polymer beads as a core, an insoluble lake product of a dye, a colored emulsion, and a colored latex may also be exemplified.

Examples of the coloring agent may include, besides the pigment, dyes such as a hydrophilic anionic dye, a direct dye, a cationic dye, a reactive dye, a polymer dye and an oil soluble dye, wax resin powders or emulsions colored by a dye, a fluorescent dye or a fluorescent pigment.

The volume average particle size of the coloring agent may range from 10 nm to 1,000 nm.

The volume average particle size of the coloring agent refers to a particle size of a coloring agent itself, or a particle size of a coloring agent adhered with an additive when the additive such as a dispersant is adhered to the coloring agent.

The measurement of the volume average particle size is performed by MICROTRAC UPA particle size analyzer 9340 (manufactured by Leeds & Northrup Corp.) as a measuring device. The measurement was carried out with 4 ml of ink placed in a measuring cell. As input values at the time of the measurement, the viscosity of the ink was input as the viscosity, and the density of the coloring agent was input as the density of dispersion particles.

The content (concentration) of the coloring agent is, for example, preferably from 0.5 mass % to 15 mass % and more preferably from 1 mass % to 10 mass %, based on the ink.

(Surfactant)

Examples of the surfactant may include an anionic surfactant, a nonionic surfactant, a cationic surfactant, and an amphoteric surfactant, and preferably include an anionic surfactant, and a nonionic surfactant.

Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate.

Among them, as the anionic surfactant, dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate may be preferable.

Examples of the nonionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol.

Among them, as the nonionic surfactant, polyoxyethylenenonyl phenylether, polyoxyethyleneoctyl phenylether, polyoxyethylenedodecyl phenylether, polyoxyethylene alkylether, polyoxyethylene fatty acid ester, sorbitan fatty acid ester, polyoxyethylene sorbitan fatty acid ester, fatty acid alkyloamide, polyethylene glycol polypropylene glycol block copolymer, acetylene glycol, and a polyoxyethylene adduct of acetylene glycol may be preferable.

Further examples of the nonionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

The hydrophilic/hydrophobic balance (HLB) of the surfactant may, for example, range from 3 to 20 in consideration of solubility or the like.

The surfactant may be used either alone or in combination of two or more kinds thereof.

The content of the surfactant may preferably range from 0.1 mass % to 10 mass %, more preferably from 0.1 mass % to 5 mass %, and further more preferably from 0.2 mass % to 3 mass % based on the ink.

(Other Additives)

Examples of other additives may include conventionally known additives, such as an ink ejection property improving agent (e.g., polyethyleneimine, polyamines, polyvinylpyrrolidone, polyethylene glycol, ethyl cellulose, and carboxymethyl cellulose), a conductivity/pH adjuster (e.g., alkaline metal compounds such as potassium hydroxide, sodium hydroxide, and lithium hydroxide), a reactive dilution solvent, a penetrant, a pH buffer, an antioxidant, a fungicide, a viscosity modifier, a conductive agent, a chelating agent, a UV absorbent, and an infrared absorbent.

(Physical Properties of Ink)

The surface tension of the ink according to the present exemplary embodiment may range from 20 mN/m to 45 mN/m.

As the surface tension, a value measured through a Wilhelmy type surface tensiometer (manufactured by Kyowa Interface Science Co., Ltd) under a condition of 23° C. and 55% RH was employed.

The viscosity of the ink according to the present exemplary embodiment, for example, may range from 1.5 mPa·s to 30 mPa·s. As the viscosity, a value measured through TV-20 (manufactured by Toki Sangyo Co., Ltd) as a measuring device under a condition of a measurement temperature of 23° C., and a shear rate of 750 $s^{-1}$ was employed.

[Recording Apparatus/Recording Method]

The recording apparatus according to the present exemplary embodiment is provided with an ejecting device configured to eject the ink (ultraviolet-curable aqueous ink) according to the present exemplary embodiment, and an ultraviolet irradiation device configured to irradiate UV rays at a wavelength range of 375 nm or more and 450 nm or less to the ejected ink.

In the recording apparatus according to the present exemplary embodiment, a recording method is performed, the method including ejecting the ink (ultraviolet-curable aqueous ink) according to the present exemplary embodiment, and irradiating UV rays at a wavelength range of 375 nm or more and 450 nm or less to the ejected ink.

The recording apparatus according to the present exemplary embodiment may be provided with an ink cartridge which contains the ink (ultraviolet-curable aqueous ink) according to the present exemplary embodiment, and is made as a cartridge form to be detachable from the recording apparatus.

Hereinafter, the recording apparatus according to the present exemplary embodiment will be described with reference to drawings.

Figure 2:
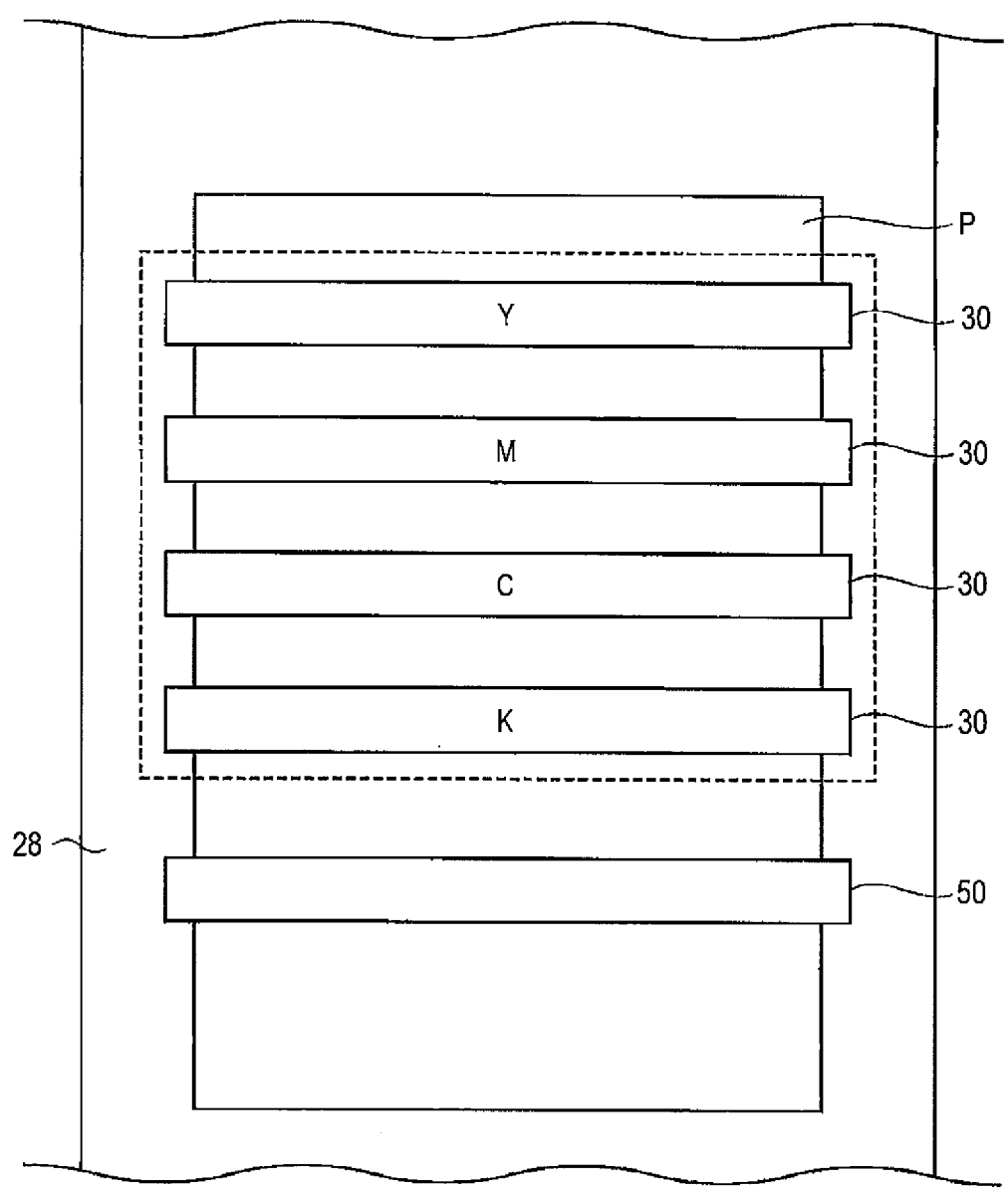
FIG. 2 is a partial plan view illustrating the circumference of a recording head in the inkjet recording apparatus according to the present exemplary embodiment.

FIG. 1 is a schematic view illustrating an inkjet recording apparatus according to the present exemplary embodiment. FIG. 2 is a partial plan view illustrating the circumference of a recording head in the inkjet recording apparatus according to the present exemplary embodiment.

An inkjet recording apparatus 12 according to the present exemplary embodiment, for example, as illustrated in FIGS. 1 and 2, is provided with a paper feeding container 16 at a lower side within a case 14, and a mechanism configured to take out papers P (an example of a recording medium) layered within the paper feeding container 16, one by one by a take-out roll 18. The paper P which has been taken out is conveyed by a plurality of pairs of carrying-in rollers 20 which constitute a carrying-in path 22.

An endless conveyor belt 28 that is held by being tensioned by a driving roll 24 and a driven roll 26 is disposed above the paper feeding container 16. A recording head 30 (an example of the ejecting device) is disposed above the conveyor belt 28, which faces a flat portion of the conveyor belt 28. The area where the recording head 30 faces the flat portion of the conveyor belt 28 is set as an ejection area at which ink droplets are ejected from the recording head 30 to the paper P. The paper P conveyed by the pairs of carrying-in roller 20 reaches the ejection area by being supported by the conveyor belt 28, and is placed to face the recording head 30, and then droplets of the ink ejected from the recording head 30 according to image information are adhered on the surface of the paper P.

The recording head 30 of each color is connected to an ink cartridge 30A of each color that is detachable from the inkjet recording apparatus 12 via a supply tube (not illustrated), and an ink of each color is supplied to the recording head 30 by the ink cartridge 30A.

The recording head 30, for example, as illustrated in FIG. 2, is an elongated recording head that has an effective recording area (a disposition area of a nozzle configured to eject the ink) not less than the width of the paper P (the length in a direction crossing (e.g., perpendicular to) the conveyance direction of the paper P).

The recording head 30 is not limited thereto, and may employ another recording head that is shorter than the width of the paper P, and ejects the ink by moving in the width direction of the paper P (so-called carriage type).

The recording head 30 may employ conventional types such as a so-called thermal type in which ink droplets are ejected by heat, or a so-called piezoelectric type in which ink droplets are ejected by a pressure.

As the recording heads 30, four recording heads which correspond to four colors, respectively, for example, yellow (Y), magenta (M), cyan (C), and black (K) are disposed in an array according to a conveyance direction. It is natural that the recording heads 30 are not limited to the form where the four recording heads 30 corresponding to the four colors, respectively are disposed, and depending on purposes, one recording head 30 corresponding to black (K) may be disposed, or four or more recording heads 30 corresponding to respective four or more colors additionally containing another neutral color may be disposed.

A charging roll 32 is disposed at the upstream side (the conveyance direction upstream side of the paper P) of the recording head 30. The charging roll 32 is driven while the conveyor belt 28 and the paper P are interposed between the charging roll 32 and the driven roll 26, and thereby a potential difference is applied between the charging roll 32 and the grounded driven roll 26, and an electric charge is applied to the paper P so as to electrostatically adsorb the paper P on the conveyor belt 28.

An ultraviolet irradiation device 50 is disposed at the downstream side of the recording head 30 (the conveyance direction downstream side of the paper P) above the conveyor belt 28.

The ultraviolet irradiation device 50 irradiates UV rays on the ink adhered on the paper P on the conveyor belt 28.

The ultraviolet irradiation device 50, for example, as illustrated in FIG. 2, is an elongated ultraviolet irradiation device that has an effective UV irradiation area (a disposition area of a light source configured to irradiate ultraviolet rays) not less than the width of a recordable area of the recording head 30 (in a direction crossing (e.g., perpendicular to) the conveyance direction of the paper P).

The ultraviolet irradiation device 50 is not limited thereto, and may employ another ultraviolet irradiation device that is shorter than the width of the recordable area of the recording head 30, and irradiates UV rays by moving in the width direction of the recordable area of the recording head 30 (so-called carriage type).

As the light source of the ultraviolet irradiation device 50, a light source with a good energy efficiency that irradiates UV rays at a wavelength range at a long wavelength side (a wavelength range of 375 nm or more and 450 nm or less) close to a visible range may be employed. Specifically, a light emitting diode (LED), a semiconductor laser (LD, VCSEL), and a laser wavelength converting light source may be exemplified.

Among them, as the light source of the UV irradiation device 50, an ultraviolet light emitting diode (UV-LED) is preferable.

A releasing plate 34 is disposed at the downstream side of the ultraviolet irradiation device 50 (the conveyance direction downstream side of the paper P), which is configured to release the paper P from the conveyor belt 28. The released paper P is conveyed at the downstream side of the releasing plate 34 (the conveyance direction downstream side of the paper P) by a plurality of pairs of discharge rollers 38 constituting a discharge path 36, and is discharged to a paper discharge tray 40 provided above the case 14.

Hereinafter, an operation of the recording apparatus 12 according to the present exemplary embodiment will be described.

In the recording apparatus 12 according to the present exemplary embodiment, the paper P is taken out from the paper feeding container 16, one by one by the take-out roll 18, and is conveyed to the conveyor belt 28 via the carrying-in path 22.

Then, the paper P is electrostatically adsorbed on the conveyor belt 28 by the charging roll 32, and conveyed to a position below the recording head 30 by rotation of the conveyor belt 28.

Then, the ink is ejected by the recording head 30 to record a required image on the paper P.

Then, on the ink adhered on the paper P, UV rays are irradiated by the UV irradiation device 50, by which a curing reaction (polymerization) of the UV polymerizable compounds in the ink is performed. Thus, the ink (the image formed by the ink) is cured and fixed on the paper P.

The ultraviolet irradiation conditions of the ultraviolet irradiation device 50 vary according to the kinds of the ultraviolet polymerizable compound contained in the ink, but may be preferably conditions by which the ultraviolet polymerizable compounds in the ink ejected on the paper P are cured through a curing reaction (polymerization).

Specifically, the ultraviolet irradiation conditions may include a wavelength range (center wavelength) from 375 nm to 450 nm, an irradiation intensity from 10 mW/cm$^2$ to 5000 mW/cm$^2$ (preferably, from 50 mW/cm$^2$ to 500 mW/cm$^2$), and an irradiation time from 0.1 milliseconds to 10 seconds (preferably, from 10 milliseconds to 100 milliseconds).

Then, the paper P on which the ink (the image formed by the ink) is fixed (formed) is discharged to the paper discharge tray 40 via the discharge path 36.

In this manner, in the recording apparatus 12 according to the present exemplary embodiment, the paper P on which the ink (the image formed by the ink) is fixed (formed) may be obtained.

As described above, in the recording apparatus 12 according to the present exemplary embodiment, ink droplets are directly ejected on the surface of the paper P by the recording head 30, but the present invention is not limited thereto. For example, ink droplets may be ejected on an intermediate transfer body, and then the ink droplets on the intermediate transfer body may be transferred on the paper P.

As described above, in the recording apparatus 12 according to the present exemplary embodiment, the ink (the image formed by the ink) is fixed (formed) on a sheet of paper as the paper P. Meanwhile, the ink (the image formed by the ink) may be fixed (formed) on a roll paper as the paper P by using a continuous feed printer.

It is natural that the present exemplary embodiment is not construed in a limited way, and may be made within a range satisfying requirements of the present invention.

Hereinafter, the present invention will be described in more detail by examples, but is not particularly limited by these examples.

EXAMPLE 1

| | |
|---|---|
| Urethane acrylate oligomer aqueous emulsion: (40 mass % of ultraviolet polymerizable compound: manufactured by ARAKAWA CHEMICAL INDUSTRIES, LTD.) | 62.5 parts by mass |
| Cyan pigment aqueous dispersion liquid: (manufactured by Cabot Corporation: pigment concentration 10 mass %) | 20 parts by mass |
| 4-(2-hydroxyethyl)morpholine (MO-1): | 10 parts by mass |
| Glycerin: | 4 parts by mass |
| Surfynol 440 (manufactured by Nissin Chemical Industry Co., Ltd): | 3 parts by mass |
| Acetic acid: | 2 parts by mass |
| Kayacure DETX-S: (water-insoluble ultraviolet polymerization initiator: thioxanthone compound: 2,4-diethylthioxanthone: manufactured by Nippon Kayaku Co., Ltd.) | 1.5 parts by mass |
| Kayacure EPA: (water-insoluble tertiary amine compound: 4-dimethylamino ethyl benzoate: manufactured by Nippon Kayaku Co., Ltd.) | 1 part by mass |
| Pure water: | 5 parts by mass |

The materials of the composition were mixed with each other and filtered with a filter of 5 μm to obtain an ultraviolet-curable aqueous ink of a cyan color.

Kayacure DETX-S (ultraviolet polymerization initiator) has an absorption peak around 385 nm. In 4-(2-hydroxyethyl)morpholine, solubility (25° C.) of Kayacure DETX-S was 15 mass %, solubility (25° C.) of Kayacure EPA was 30 mass %, and solubility of the total thereof was 25 mass %.

COMPARATIVE EXAMPLE 1

| | |
|---|---|
| Urethane acrylate oligomer aqueous emulsion: (40 mass % of UV polymerizable compound: manufactured by ARAKAWA CHEMICAL INDUSTRIES, LTD.) | 62.5 parts by mass |
| Cyan pigment aqueous dispersion liquid: (manufactured by Cabot Corporation: pigment concentration 10 mass %) | 20 parts by mass |
| 4-(2-hydroxyethyl)morpholine (MO-1): | 10 parts by mass |
| Glycerin: | 4 parts by mass |
| Surfynol 440 (manufactured by Nissin Chemical Industry Co., Ltd): | 3 parts by mass |
| Acetic acid: | 2 parts by mass |
| Darocure 1173: (water-soluble ultraviolet polymerization initiator: acylphosphine oxide compound: 2-hydroxy-2-methyl-l-phenyl-propane-1-one: manufactured by BASF) | 2 parts by mass |
| Pure water: | 5 parts by mass |

The materials of the composition were mixed with each other and filtered with a filter of 5 μm to obtain an ultraviolet-curable aqueous ink of a cyan color.

Darocure 1173 (ultraviolet polymerization initiator) has an absorption peak at a region around 320 nm or less than 300 nm.

COMPARATIVE EXAMPLE 2

| | |
|---|---|
| Urethane acrylate oligomer aqueous emulsion: (40 mass % of ultraviolet polymerizable compound: manufactured by ARAKAWA CHEMICAL INDUSTRIES, LTD.) | 62.5 parts by mass |
| Cyan pigment aqueous dispersion liquid: (manufactured by Cabot Corporation: pigment concentration 10 mass %) | 20 parts by mass |
| Glycerin: | 14 parts by mass |
| Surfynol 440 (manufactured by Nissin Chemical Industry Co., Ltd): | 3 parts by mass |
| Kayacure DETX-S: (water-insoluble ultraviolet polymerization initiator: thioxanthone compound: 2,4-diethylthioxanthone: manufactured by Nippon Kayaku Co., Ltd.) | 1.5 parts by mass |
| Kayacure EPA: (water-insoluble tertiary amine compound: 4-dimethylamino ethyl benzoate: manufactured by Nippon Kayaku Co., Ltd.) | 1 part by mass |
| Pure water: | 5 parts by mass |

The materials of the composition were mixed with each other and filtered with a filter of 5 μm to obtain an ultraviolet-curable aqueous ink of a cyan color.

Kayacure DETX-S (ultraviolet polymerization initiator) has an absorption peak around 385 nm. In glycerin, solubility (25° C.) of Kayacure DETX-S was less than 1 mass %, solubility (25° C.) of Kayacure EPA was less than 1 mass %, and solubility of the total thereof was less than 1 mass %. These compounds were not dissolved.

EXAMPLE 2

| | |
|---|---|
| Urethane acrylate oligomer aqueous emulsion: (40 mass % of ultraviolet polymerizable compound: manufactured by ARAKAWA CHEMICAL INDUSTRIES, LTD.) | 50 parts by mass |
| Cyan pigment aqueous dispersion liquid: (manufactured by Cabot Corporation: pigment concentration 10 mass %) | 20 parts by mass |
| 4-ethylmorpholine (MO-2): | 8 parts by mass |
| Surfynol 465 (manufactured by Nissin Chemical Industry Co., Ltd): | 2 parts by mass |
| Acetic acid: | 2 parts by mass |
| 2-isopropylthioxanthone: (water-insoluble ultraviolet polymerization initiator: thioxanthone compound: manufactured by Tokyo Chemical Industry Co., Ltd.) | 0.55 parts by mass |
| Kayacure EPA: (water-insoluble tertiary amine compound: 4-dimethylamino ethyl benzoate: manufactured by Nippon Kayaku Co., Ltd) | 0.45 parts by mass |
| Pure water: | 15 parts by mass |

The materials of the composition were mixed with each other and filtered with a filter of 5 μm to obtain an utraviolet-curable aqueous ink of a cyan color.

2-isopropylthioxanthone (ultraviolet polymerization initiator) has an absorption peak at 380 nm. In 4-ethylmorpholine, solubility (25° C.) of 2-isopropylthioxanthone was 30 mass %, solubility (25° C.) of Kayacure EPA was 40 mass %, and solubility of the total thereof was 50 mass %.

EXAMPLE 3

| | |
|---|---|
| Urethane acrylate oligomer aqueous emulsion: (40 mass % of UV polymerizable compound: manufactured by ARAKAWA CHEMICAL INDUSTRIES, LTD.) | 50 parts by mass |
| Cyan pigment aqueous dispersion liquid: (manufactured by Cabot Corporation: pigment concentration 10 mass %) | 30 parts by mass |
| Glycerin: | 5 parts by mass |
| 2-(2-butoxyethoxy)ethanol: | 5 parts by mass |
| Olfine E1010 (manufactured by Nissin Chemical Industry Co., Ltd): | 1.5 parts by mass |
| Acetic acid: | 2 parts by mass |
| Kayacure DETX-S: (water-insoluble ultraviolet polymerization initiator: thioxanthone compound: 2,4-diethylthioxanthone: manufactured by Nippon Kayaku Co., Ltd) | 0.8 parts by mass |
| Kayacure EPA: (water-insoluble tertiary amine compound: 4-dimethylamino ethyl benzoate: manufactured by Nippon Kayaku Co., Ltd) | 0.5 parts by mass |
| Pure water: | 10 parts by mass |

The materials of the composition were mixed with each other and filtered with a filter of 5 μm to obtain an ultraviolet-curable aqueous ink of a cyan color.

Kayacure DETX-S (ultraviolet polymerization initiator) has an absorption peak around 385 nm. In 2-(2-butoxyethoxy)ethanol, solubility (25° C.) of Kayacure DETX-S was 17 mass %, solubility (25° C.) of Kayacure EPA was 30 mass %, and solubility of the total thereof was 35 mass %.

EXAMPLE 4

| | |
|---|---|
| Urethane acrylate oligomer aqueous emulsion: (40 mass % of ultraviolet polymerizable compound: manufactured by ARAKAWA CHEMICAL INDUSTRIES, LTD.) | 40 parts by mass |
| Black pigment aqueous dispersion liquid: (manufactured by Cabot Corporation: pigment concentration 10 mass %) | 20 parts by mass |
| Glycerin: | 5 parts by mass |
| 3-morpholino-1,2-propanediol (MO-3): | 5 parts by mass |
| Olfine E1004 (manufactured by Nissin Chemical Industry Co., Ltd): | 2 parts by mass |
| Kayacure DETX-S: (water-insoluble ultraviolet polymerization initiator: thioxanthone compound: 2,4-diethylthioxanthone: manufactured by Nippon Kayaku Co., Ltd) | 0.6 parts by mass |
| Kayacure EPA: (water-insoluble tertiary amine compound: 4-dimethylamino ethyl benzoate: manufactured by Nippon Kayaku Co., Ltd) | 0.4 parts by mass |
| Pure water: | 5 parts by mass |

The materials of the composition were mixed with each other and filtered with a filter of 5 μm to obtain an ultraviolet-curable aqueous ink of a black color.

Kayacure DETX-S (ultraviolet polymerization initiator) has an absorption peak at 385 nm. In 3-morpholino-1,2-propanediol, solubility (25° C.) of Kayacure DETX-S was 9 mass %, solubility (25° C.) of Kayacure EPA was 30 mass %, and solubility of the total thereof was 22 mass %.

EXAMPLE 5

| | |
|---|---|
| Urethane acrylate oligomer aqueous emulsion: (40 mass % of UV polymerizable compound: manufactured by ARAKAWA CHEMICAL INDUSTRIES, LTD.) | 70 parts by mass |
| Black pigment aqueous dispersion liquid: (manufactured by Cabot Corporation: pigment concentration 10 mass %) | 30 parts by mass |
| Glycerin: | 5 parts by mass |
| 3-methylsulfolane: | 8 parts by mass |
| Surfynol 440 (manufactured by Nissin Chemical Industry Co., Ltd): | 2 parts by mass |
| Kayacure DETX-S: (water-insoluble ultraviolet polymerization initiator: thioxanthone compound: 2,4-diethylthioxanthone: manufactured by Nippon Kayaku Co., Ltd) | 1.5 parts by mass |
| Kayacure EPA: (water-insoluble tertiary amine compound: 4-dimethylamino ethyl benzoate: manufactured by Nippon Kayaku Co., Ltd) | 1 part by mass |
| Pure water: | 5 parts by mass |

The materials of the composition were mixed with each other and filtered with a filter of 5 μm to obtain an ultraviolet-curable aqueous ink of a black color.

Kayacure DETX-S (ultraviolet polymerization initiator) has an absorption peak at 385 nm. In 3-methylsulfolane, solubility (25° C.) of Kayacure DETX-S was 4 mass %, solubility (25° C.) of Kayacure EPA was 18 mass %, and solubility of the total thereof was 15 mass %.

EXAMPLE 6

| | |
|---|---|
| Urethane acrylate oligomer aqueous emulsion: (35 mass % of UV polymerizable compound: manufactured by Daicel Cytec Co., Ltd.) | 42.9 parts by mass |
| Magenta pigment aqueous dispersion liquid: (manufactured by Cabot Corporation: pigment concentration 10 mass %) | 20 parts by mass |
| 4-acetylmorpholine (MO-5): | 12 parts by mass |
| Glycerin: | 5 parts by mass |
| Surfynol 440 (manufactured by Nissin Chemical Industry Co., Ltd): | 3 parts by mass |
| Acetic acid: | 3 parts by mass |
| Kayacure DETX-S: (water-insoluble ultraviolet polymerization initiator: thioxanthone compound: 2,4-diethylthioxanthone: manufactured by Nippon Kayaku Co., Ltd) | 1.5 parts by mass |
| Kayacure EPA: (water-insoluble tertiary amine compound: 4-dimethylamino ethyl benzoate: manufactured by Nippon Kayaku Co., Ltd) | 1 part by mass |
| Pure water: | 5 parts by mass |

The materials of the composition were mixed with each other and filtered with a filter of 5 μm to obtain an ultraviolet-curable aqueous ink of a magenta color.

Kayacure DETX-S (UV polymerization initiator) has an absorption peak around 385 nm. In 4-acetylmorpholine, solubility (25° C.) of Kayacure DETX-S was 20 mass %, solubility (25° C.) of Kayacure EPA was 35 mass %, and solubility of the total thereof was 30 mass %.

EXAMPLE 7

| | |
|---|---|
| Urethane acrylate oligomer aqueous emulsion: (35 mass % of UV polymerizable compound: manufactured by Daicel Cytec Co., Ltd.) | 57.1 parts by mass |
| Yellow pigment aqueous dispersion liquid: (manufactured by Cabot Corporation: pigment concentration 10 mass %) | 20 parts by mass |
| 4-(2-aminoethyl)morpholine (MO-6): | 7 parts by mass |
| Glycerin: | 7 parts by mass |
| Surfynol 440 (manufactured by Nissin Chemical Industry Co., Ltd): | 2 parts by mass |
| Acetic acid: | 2 parts by mass |
| Kayacure DETX-S: (water-insoluble ultraviolet polymerization initiator: thioxanthone compound: 2,4-diethylthioxanthone: manufactured by Nippon Kayaku Co., Ltd) | 1.2 parts by mass |
| Kayacure EPA: (water-insoluble tertiary amine compound: 4-dimethylamino ethyl benzoate: manufactured by Nippon Kayaku Co., Ltd) | 0.8 parts by mass |
| Pure water: | 5 parts by mass |

The materials of the composition were mixed with each other and filtered with a filter of 5 μm to obtain an ultraviolet-curable aqueous ink of a yellow color.

Kayacure DETX-S (ultraviolet polymerization initiator) has an absorption peak around 385 nm. In 4-(2-aminoethyl)morpholine, solubility (25° C.) of Kayacure DETX-S was 14 mass %, solubility (25° C.) of Kayacure EPA was 30 mass %, and solubility of the total thereof was 25 mass %.

EXAMPLE 8

| | |
|---|---|
| Urethane acrylate oligomer aqueous emulsion: (40 mass % of UV polymerizable compound: manufactured by ARAKAWA CHEMICAL INDUSTRIES, LTD.) | 50 parts by mass |
| Cyan pigment aqueous dispersion liquid: (manufactured by Cabot Corporation: pigment concentration 10 mass %) | 25 parts by mass |
| 4-(2-hydroxyethyl)morpholine (MO-1): | 15 parts by mass |
| Glycerin: | 6 parts by mass |
| Surfynol 440 (manufactured by Nissin Chemical Industry Co., Ltd): | 2.5 parts by mass |
| Hydrochloric acid: | 1.5 parts by mass |
| Isopropyl thioxanthone: (water-insoluble ultraviolet polymerization initiator) | 1.2 parts by mass |
| 4-diethylamino ethyl benzoate: (water-insoluble tertiary amine compound) | 0.8 parts by mass |
| Pure water: | 5 parts by mass |

The materials of the composition were mixed with each other and filtered with a filter of 5 μm to obtain an ultraviolet-curable aqueous ink of a cyan color.

Isopropylthioxanthone has an absorption peak around 385 nm. In 4-(2-hydroxyethyl)morpholine, solubility (25° C.) of isopropylthioxanthone was 13 mass %, solubility (25° C.) of 4-diethylamino ethyl benzoate was 27 mass %, and solubility of the total thereof was 25 mass %.

EXAMPLE 9

| | |
|---|---|
| Urethane acrylate oligomer aqueous emulsion: (40 mass % of UV polymerizable compound: manufactured by ARAKAWA CHEMICAL INDUSTRIES, LTD.) | 45 parts by mass |
| Black pigment aqueous dispersion liquid: (manufactured by Cabot Corporation: pigment concentration 10 mass %) | 25 parts by mass |
| Glycerin: | 5 parts by mass |
| 4-hydroxypropylmorpholine (MO-10): | 5 parts by mass |
| Olfine E1010 (manufactured by Nissin Chemical Industry Co., Ltd): | 2.5 parts by mass |
| Methyl isopropylthioxanthone: (water-insoluble ultraviolet polymerization initiator) | 0.6 parts by mass |
| 4-dimethylamino 3-methylbutyl benzoate: (water-insoluble tertiary amine compound) | 0.4 parts by mass |
| Pure water: | 10 parts by mass |

The materials of the composition were mixed with each other and filtered with a filter of 5 μm to obtain an ultraviolet-curable aqueous ink of a black color.

Methylisopropylthioxanthone (ultraviolet polymerization initiator) has an absorption peak at 385 nm. In 4-hydroxypropylmorpholine, solubility (25° C.) of methylisopropyl thioxanthone was 7 mass %, solubility (25° C.) of Kayacure EPA was 18 mass %, and solubility of the total thereof was 20 mass %.

COMPARATIVE EXAMPLE 3

| | |
|---|---|
| Urethane acrylate oligomer aqueous emulsion: (35 mass % of ultraviolet polymerizable compound: manufactured by Daicel Cytec Co., Ltd.) | 42.9 parts by mass |
| Yellow pigment aqueous dispersion liquid: (manufactured by Cabot Corporation: pigment concentration 10 mass %) | 20 parts by mass |
| 4-hydroxypropyl morpholine (MO-10): | 5 parts by mass |
| Glycerin: | 5 parts by mass |
| Surfynol 440 (manufactured by Nissin Chemical Industry Co., Ltd): | 1.7 parts by mass |
| Chlorothioxanthone: (water-insoluble ultraviolet polymerization initiator) | 1.5 parts by mass |
| Pure water: | 5 parts by mass |

The materials of the composition were mixed with each other and filtered with a filter of 5 μm to obtain an ultraviolet-curable aqueous ink of a magenta color.

Chlorothioxanthone (ultraviolet polymerization initiator) has an absorption peak around 385 nm. In 4-hydroxypropylmorpholine, solubility (25° C.) of chlorothioxanthone was 20 mass %.

[Evaluation]

Following evaluations were performed on the ultraviolet-curable water-soluble ink obtained from each of examples was evaluated. The evaluation results are noted in Table 1.

—Precipitate Evaluation—

The ultraviolet-curable water-soluble ink obtained from each of examples was stored at room temperature (25° C.) for a week, and whether or not there was precipitate was visually determined. Evaluation criteria are as follows.

G1: Precipitate exists
G2: No precipitate

—Ink Curability Evaluation—

The ultraviolet-curable water-soluble ink obtained from each of examples was coated on an OHP (overhead projector) sheet with a film thickness of about 18 μm by a slit coater, and then was irradiated with UV rays with an intensity of 2 W/cm² by a UV-LED lamp with an emission wavelength of 395 nm. The integrated light quantity until the ink was cured was measured. After the surface of the cured film was touched with a finger, whether or not a trace remained was visually determined. When no trace of a finger remained, the film was determined to be cured. Evaluation criteria are as follows.

G1: Cured at integrated light quantity of less than 6 J/cm²
G2: Cured at integrated light quantity of 6 J/cm² or more, or not cured —Image Quality Evaluation—

By using the ultraviolet-curable water-soluble ink obtained from each of examples, line, text and solid images were printed on Next-IJ paper by using a piezo head with a resolution of 1200 dpi (dot per inch), and then irradiated with UV rays under a condition of integrated light quantity of 10 J/cm² by a UV-LED lamp with an emission wavelength of 395 nm. The image quality of the printed image was evaluated. Evaluation criteria are as follows.

G1: No large omission of image, no significant blur of image
G2: No significant blur of image, but slightly turbid image
G3: At least one case of many omissions of image due to non-discharge of ink from recording head, and significant blur of image occurs —Offset Evaluation—

By a continuous feed printer, the ultraviolet-curable water-soluble ink obtained from each of examples was continuously printed on a roll paper that is conveyed at a conveyance rate of 20 mm/s to form an line-shaped image, and was irradiated with UV rays by a UV-LED lamp having an emission wavelength of 395 nm under a condition of integrated light quantity of 10 J/cm². Then, the roll paper was wound and taken out. After the roll paper was left in a roll winding state, the offset level at the printing reverse side was evaluated. Evaluation criteria are as follows.

G1: No offset
G2: Slight offset
G3: Considerable offset
G4: Significant offset, and deterioration of image quality of table image due to show-through

TABLE 1

| | Precipitate evaluation | Ink curability evaluation | Image quality evaluation | Offset evaluation |
|---|---|---|---|---|
| Example 1 | G1 | G1 | G1 | G1 |
| Comp. Example 1 | G1 | G2 | G3 | G4 |
| Comp. Example 2 | G2 | G1 | G3 | G4 |
| Example 2 | G1 | G1 | G1 | G1 |
| Example 3 | G1 | G1 | G2 | G1 |
| Example 4 | G1 | G1 | G1 | G2 |
| Example 5 | G1 | G1 | G2 | G3 |
| Example 6 | G1 | G1 | G1 | G1 |
| Example 7 | G1 | G1 | G1 | G1 |
| Example 8 | G1 | G1 | G1 | G1 |
| Example 9 | G1 | G1 | G2 | G2 |
| Comp. Example 3 | G1 | G2 | G2 | G4 |

From the results, it can be understood that the present examples can achieve better results in precipitate evaluation, ink curability evaluation, image quality evaluation, and offset evaluation than comparative examples.

What is claimed is:

1. An ultraviolet-curable aqueous ink comprising:
   an ultraviolet polymerizable compound;
   a water-insoluble thioxanthone compound having an absorption at a wavelength range of 375 nm or more and 450 nm or less,
   a water-insoluble tertiary amine compound,
   water, and
   a water-soluble organic solvent at least including a solvent (A) that dissolves the thioxanthone compound and the tertiary amine compound, wherein solubility of each of the thioxanthone compound and the tertiary amine compound in the solvent (A) is 8 mass % or more, and the solvent (A) is a compound having a morpholine skeleton.

2. An ink cartridge containing the ultraviolet-curable aqueous ink according to claim 1.

3. A recording apparatus comprising:
   an ejecting device that ejects the ultraviolet-curable aqueous ink according to claim 1; and
   an ultraviolet irradiation device that irradiates UV rays at a wavelength range of 375 nm or more and 450 nm or less to the ejected ultraviolet-curable aqueous ink.

4. A recording method comprising:
   ejecting the ultraviolet-curable aqueous ink according to claim 1; and
   irradiating UV rays at a wavelength range of 375 nm or more and 450 nm or less to the ejected ultraviolet-curable aqueous ink.

* * * * *